United States Patent [19]

Tsao

[11] Patent Number: 5,394,343
[45] Date of Patent: Feb. 28, 1995

[54] ELECTRONIC TIRE GAUGE

[75] Inventor: Kuey Y. Tsao, Palatine, Ill.

[73] Assignee: Integrated Sensor Technologies Inc., Palatine, Ill.

[21] Appl. No.: 49,505

[22] Filed: Apr. 19, 1993

[51] Int. Cl.[6] .................................................. G01N 7/00
[52] U.S. Cl. ...................................... 364/558; 73/723; 73/754
[58] Field of Search .............................. 364/556, 558; 73/204.14, 723–728, 733–735, 753, 754, 708, 745, 746

[56] References Cited

U.S. PATENT DOCUMENTS

| | | | |
|---|---|---|---|
| Re. 33,028 | 8/1989 | Simpson | 137/82 |
| 3,697,918 | 10/1972 | Orth et al. | 338/3 |
| 3,743,926 | 7/1973 | Yerman | 323/75 N |
| 3,952,829 | 4/1976 | Gray | 180/105 E |
| 3,973,113 | 8/1976 | Goldsamt | 235/156 |
| 4,092,523 | 5/1978 | Tava et al. | 235/310 |
| 4,228,393 | 10/1980 | Pile | 324/61 R |
| 4,228,516 | 10/1980 | Johnston, Sr. | 364/602 |
| B14,250,759 | 12/1989 | Vago et al. | 73/723 |
| 4,250,759 | 2/1981 | Vago et al. | 73/723 |
| 4,398,252 | 8/1983 | Frait | 364/426 |
| 4,471,864 | 9/1984 | Marshall | 73/163 |
| 4,488,250 | 12/1984 | Lipsey et al. | 364/709 |
| 4,615,211 | 10/1986 | Kolm et al. | 73/146.2 |
| 4,703,650 | 11/1987 | Dosjoub et al. | 73/146.5 |
| 4,704,901 | 11/1987 | Rocco et al. | 73/146.8 |
| 4,748,845 | 6/1988 | Rocco et al. | 73/146.8 |
| 4,901,079 | 2/1990 | Nagashima et al. | 341/169 |
| 4,998,438 | 3/1991 | Martin | 73/146.8 |
| 5,099,695 | 3/1992 | Sugano et al. | 73/708 |
| 5,238,184 | 8/1993 | Adams | 324/436 |

OTHER PUBLICATIONS

*Hard–to–Find Tools*, Brookstone 1992 Catalog, cover and p. 38 (illustrating Item F–14393, "Large Easy to Read Numbers Come to Tire Gauges" no month.
"Using the 8051 Microcontroller with Resonant Transducers", Tom Williamson, from *IEEE Transactions on Industrial Electronics*, vol. IE–32, No. 4, pp. 308–312, Nov. 1985.

Primary Examiner—Jack B. Harvey
Assistant Examiner—Craig Steven Miller
Attorney, Agent, or Firm—Fitch, Even, Tabin & Flannery

[57] ABSTRACT

An electronic tire pressure gauge has a tire valve stem receiver, a thin silicon square diaphragm with four diffused resistors configured in a full Wheatstone bridge as a pressure transducer, a voltage controlled oscillator, a comparator, a clock, a microprocessor with program memory, and a display. The comparator compares the stable transducer output for a given pressure with the voltage-controlled oscillator output, to yield a comparator pulse which goes high while the transducer signal is greater than the oscillator signal. The clock provides bus cycles used by the microprocessor for counting the duration of the high comparator pulse. Multiple high comparator pulses are compared, and the longest duration is selected and converted to a pressure value and displayed. Battery power is conserved by a power on/-off algorithm.

17 Claims, 14 Drawing Sheets

ELECTRONIC TIRE GAUGE

FIELD OF THE INVENTION

The present invention relates to electronic devices for measuring pressure. In particular, the present invention relates to a hand-held tire gauge for measuring the air pressure of a tire.

BACKGROUND OF THE INVENTION

Prior art types of hand-held tire gauges include both the well-known mechanical tire gauge and the more recent digital tire gauge. The hand-held mechanical tire gauge includes a housing and a stem normally held inside the housing and having numbers on the stem which indicate the amount of tire pressure. When the mechanical tire gauge is placed on the valve stem of a tire to measure pressure, the pressure forces the numbered stem from the housing. The pressure is read from the stem by reading the number which is closest to a point where the stem exits the housing. While the mechanical tire gauge is inexpensive, the mechanical tire gauge suffers from being somewhat inaccurate because of its construction and the fact that the operator must judge where the stem meets the housing to determine pressure.

More recently, digital electronics have been incorporated in a hand-held device to measure the tire pressure electronically. The digital tire gauge typically includes a pressure transducer, an analog to digital (A/D) converter, a microprocessor, a light emitting diode (LED) or a liquid crystal display (LCD) for displaying the measured tire pressure, and a battery for powering the electronic circuitry. These types of digital tire pressure gauges tend to be more accurate than the mechanical tire pressure gauge but such gauges are also much more expensive due to the cost of digital electronics in general and the cost of A/D converters, in particular.

In these gauges, the A/D converter is used to digitize an analog pressure signal generated by the pressure transducer. This digitized pressure signal is then sent to the microprocessor which converts the digitized pressure signal into one which can be displayed on the digital display. Typically, a reading is made by connecting the digital tire gauge to the valve stem and pushing a button on the gauge to begin the pressure reading. The tire pressure reading is displayed on the digital display for a certain period of time sufficiently long to enable the operator to read the tire pressure value. Once this time period has elapsed, the digital tire gauge turns itself off to save battery power.

While current digital tire gauges do make accurate readings because operator judgement is removed from the measuring process, these tire gauges can be extremely expensive relative to the price of the mechanical tire gauge. In addition, such digital tire gauges power up all internal circuitry at the press of the button even if the gauge is not completely engaged to the valve stem. Consequently, valuable battery power can be wasted. Some digital tire gauges, therefore, use lithium batteries which while increasing the number of pressure readings between battery replacement also substantially increase the device cost due to the relative high cost of lithium batteries. Consequently, what is needed is an inexpensive electronic tire gauge which is highly accurate and increases the length of time between battery replacement or eliminates the need for a battery altogether.

SUMMARY OF THE INVENTION

The present invention is an electronic tire gauge which eliminates the need for an analog to digital converter and improves the accuracy of the pressure readings. In addition, because of the novel circuitry involved, overall cost of the device is reduced and battery lifetime is extended.

A digital tire gauge includes means for applying the pressure of a tire to a transducer which generates a pressure signal having a voltage level representing the tire pressure. The pressure signal is compared to a periodic (cyclic) signal from an oscillator and comparison signals resulting from the comparison are applied to a controller which identifies the tire pressure in the form of display signals, after a number of periods (cycles) of the oscillating signal. The display signals may thus be used to indicate tire pressure on a digital readout device.

The use of a periodic signal for comparison allows a number of comparisons to be performed between cycles of the periodic signal and the pressure signal. The controller measures the time that the periodic signal is less than the pressure signals and converts the time measurements into values representing pressure. A maximum one of the values representing pressure may thus be displayed as the pressure reading.

In accordance with an embodiment, a silicon sensor is used as the pressure sensing element due to its superior piezoelastic properties. A thin silicon square diaphragm with four diffused resistors are configured in a full Wheatstone bridge. When the diaphragm receives air pressure, two sides of the diaphragm are in tensile stress and two sides are in compressive stress. The resistors on top of the tensile stress area increase their resistance and resistors on top of the compressive stress area reduce their resistor value. The differential voltage change is linear to the applied pressure. To compensate for the silicon resistor's sensitivity to temperature, a temperature compensation circuit comprising a constant current source is used to reduce any errors resulting from a change in temperature.

A voltage controlled triangular wave oscillator (VCO) circuit or integrator may advantageously be used as a source of periodic signals. Since the pressure signal generated by a silicon sensor is quite linear, a linear relationship then exists between pressure and time periods (waveform cycles).

A microcontroller including a program and a clock defining bus cycles may advantageously be used as the controller. The microprocessor counts the number of bus cycles while reading an input logic high which begins the instant the pressure transducer signal is greater than the VCO voltage during ramp-down of the VCO waveform. If the transducer signal varies during the start and end of the measurement period, this method has an averaging effect which is better than a single ramp up method. Since each bus cycle has a fixed time, the time period is the number of bus cycles multiplied by the time period of the bus cycle.

Two trimpots may be used in the VCO circuit. One is used to move the whole triangular wave form up for zero output adjustment. The second trimpot varies the oscillation frequency of the VCO and consequently the time period that is measured by the microcontroller. The accuracy, sensitivity, and resolution are therefore adjustable. Because the control voltage can be varied from zero volts to the supply voltage, an order of magnitude of frequencies can be easily obtained. In addition, this trimpot can be used to adjust for a full scale display instead of adjusting the amplifier gain during the manufacturing process.

The voltage output of the operational amplifier when the input pressure is equal to zero is made by an actual measurement. Typically, when input pressure equals zero, the operational amplifier output is not zero. By reading the output of the comparator when there is no input pressure, bias offset errors of the operational amplifier at zero input are minimized. Thus, low pressure measurement accuracy is improved.

A four bit microcontroller is extensively programmed to process the data. The device includes a test mode, a normal mode, the versatile units, multiplex pressure display, buzzer and LED control and low battery indication.

To save battery power, a power on/off algorithm is used. When a button switch is depressed to begin a pressure reading, the microcontroller shifts from standby operation to operation mode. After self test and LCD segment tests, the microcontroller turns the power on to the sensor, amplifier, and the VCO circuits. A reading at zero input pressure is made and used later in the pressure calculations. If a pressure increase is not detected (resulting from the application of the tire gauge to a pressurized valve stem), the constant power which was been applied to the sensor, amplifier, and VCO now enters a power pulse mode in which the power is switched on and off to save battery power. The power pulse mode continues until a pressure increase is detected, and once detected, power is supplied completely to the sensor, amplifier, and VCO circuit.

Solar cells can be used in place of a battery for supplying power to the device. Where solar cells are used, the controlled application of power to the sensor, amplifier, and VCO circuit is no longer necessary. The power is always on, as long as enough light is present in the environment for a measurement to take place.

DETAILED DESCRIPTION OF PREFERRED EMBODIMENTS

Figure 1:
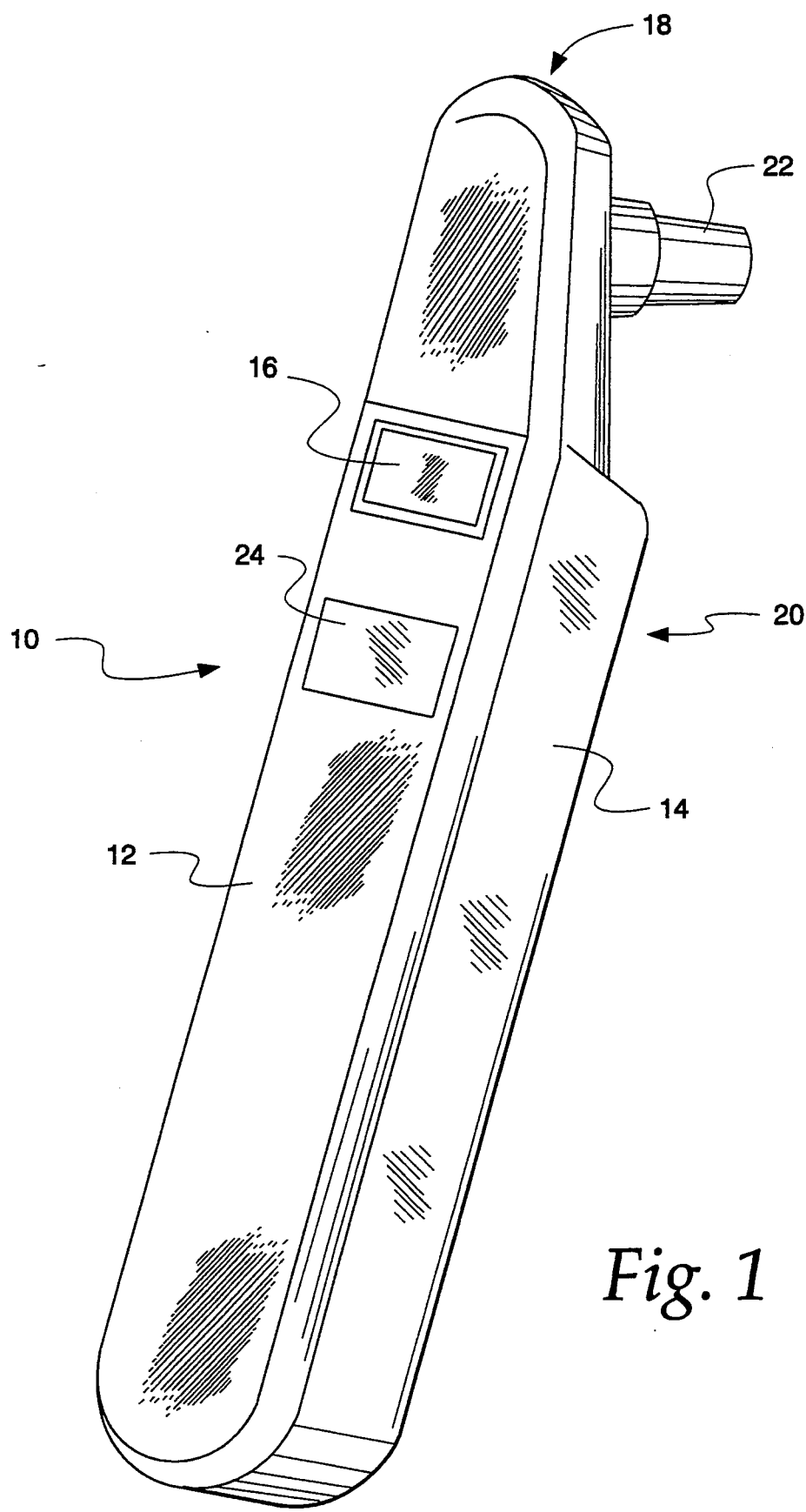
FIG. 1 is a perspective view of a hand-held tire gauge for measuring the air pressure of a tire.

FIG. 1 illustrates an electronic tire gauge 10 of the present invention. The electronic tire gauge 10 includes a two-piece housing sized to fit easily in the hand having a top piece 12 and a bottom piece 14 both made of molded plastic. Electronic circuitry and a pressure transducer are contained within the housing. The electronic tire gauge 10 includes an electronic display 16 for displaying a numerical value of the measured pressure of the tire and other parameters to be described later. Either a light emitting diode (LED) display or a liquid crystal display (LCD) can be used. An LCD display, however, is preferred due to its lower power requirement. A top portion 18 of the two-piece housing is angled with respect to a bottom portion 20 of the housing to facilitate engagement of the electronic tire gauge to the valve stem of a tire. In operation, a valve stem fitting 22 is coupled to the valve stem of the tire. Tire pressure is measured upon depression of a button 24 and the measured value is subsequently displayed on the display 16.

Figure 2A:
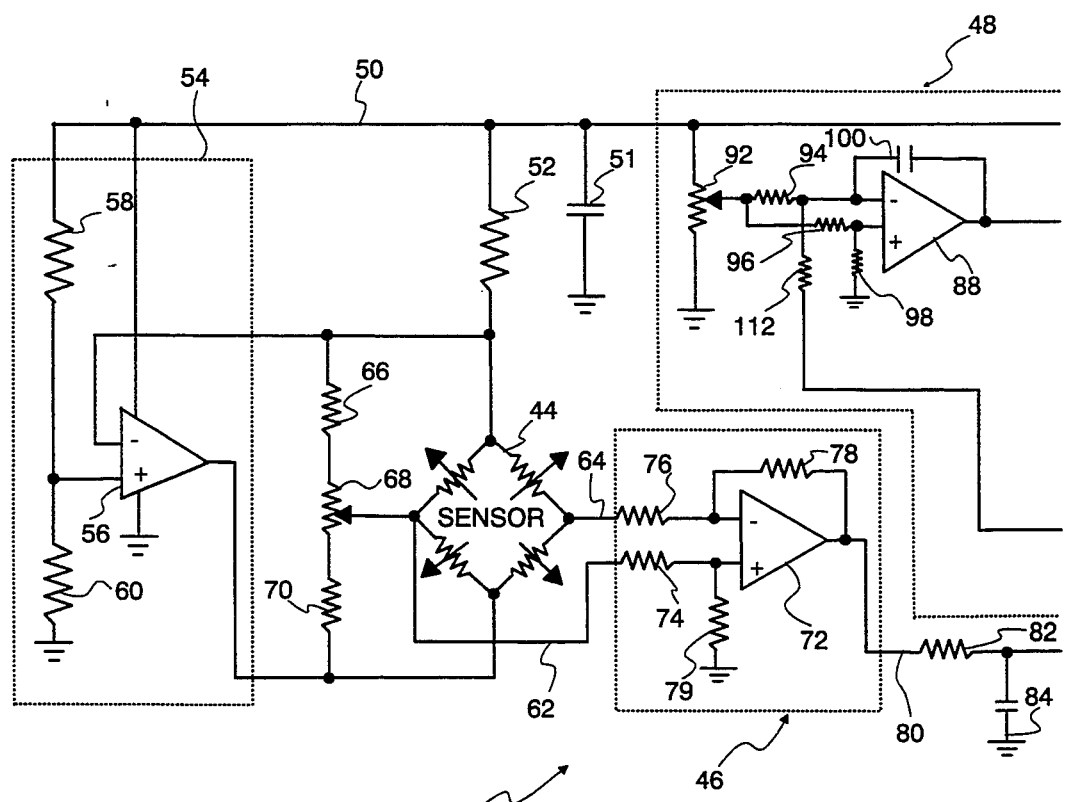
FIGS. 2A and 2B are schematic diagrams of circuitry used to make a pressure measurement.
Figure 2:
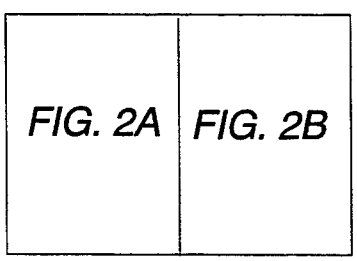
FIG. 2 shows the relative locations of the circuits of FIGS. 2A and 2B.
Figure 2B:
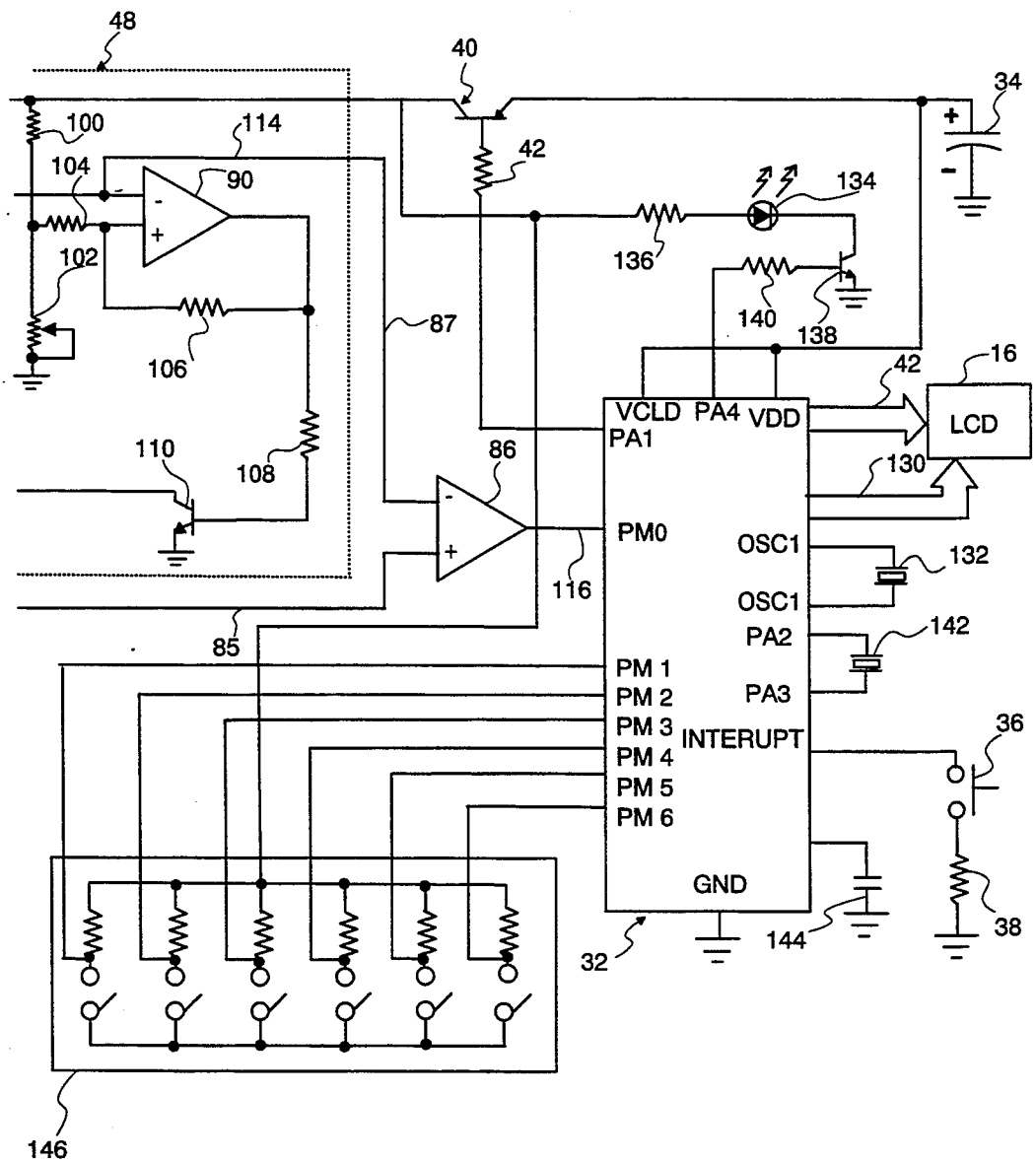

FIG. 2 illustrates an electronic circuit diagram 30 of the electronic circuitry used in the present invention to make a pressure measurement. The electronic circuitry 30 measures the pressure in a tire or other pressurized vessel and displays the pressure reading on the display 16. A microcontroller 32 controls the operation of the electronic circuit 30 and processes information to calculate a measured value of pressure. The microcontroller 32 is a 4-bit device and has a standby mode so that power can be connected to the device at all times. 8-bit or higher microcontrollers can also be used. The microcontroller 32 is a CMOS device which is connected to a power source 34 shown as a battery in FIG. 2. The power source 34 is connected to both the Vdd pin and the Vlcd pin of the microcontroller 32. The power supply 34 is coupled to the remainder of the circuitry 30 in a controlled fashion to conserve power when a battery is used as a power source.

A pressure measurement is initiated by the depression of the button 24. A mechanical switch 36 closes in response thereto and pulls the interrupt pin of the microcontroller 32 low since the switch 36 is connected to both the interrupt pin and to a resistor 38 connected to ground. The microcontroller is programmed to apply power to certain portions of the circuitry 30 at specific times. Upon closure of the switch 36, pin PA1 of the I.C. is pulled low, when directed by the microcontroller 32, thereby pulling the base of a PNP transistor 40 low through a resistor 42. Since the emitter of the transistor 40 is connected to the positive side of the power source 34, the collector of the transistor 40 is held at essentially the positive potential of the power supply 34. In addition, the display 16 receives power through a conductor line 42 connecting the display 16 to the microcontroller 32.

Whenever transistor 40 is turned on by the microcontroller 32, power is applied to a pressure transducer 44, a differential amplifier 46 and a voltage controlled oscillator (VCO) circuit 48 through a conductor 50. A capacitor 51 is provided for filtering of the power supply. The pressure transducer 44 receives air pressure through the valve stem fitting 22 once the valve stem is depressed to the valve stem of a tire. The pressure transducer 44 is preferably a silicon piezoresistive pressure sensor which is used due to its superior piezoelastic properties. A thin silicon square diaphragm with four diffused resistors configured in a full wheatstone bridge is used. When the diaphragm receives air pressure, two sides of the diaphragm are in tensile stress and two sides are in compressive stress. The resistors on top of the tensile stress area increase their resistance and resistors on top of the compressive stress area reduce their resistor value.

The pressure transducer 44 is connected to the conductor 50 through a resistor 52. The differential voltage change of the pressure sensor is linear to the applied pressure. To compensate for the silicon resistor's sensitivity to temperature, a temperature compensation circuit 54 comprising a constant current source is used to reduce any errors resulting from a change in temperature. The temperature compensation circuit 54, which is connected to the conductor 50, comprises an operational amplifier 56, and resistors 58 and 60.

The positive input of the operational amplifier 56 is connected to one side of the transducer 44 and to the resistor 52. The output of the operational amplifier is connected to another side of the transducer 44. By connecting the positive input and the output of the operational amplifier to the transducer 44, the constant current source 54 controls the power supplied to the transducer 44 is such a fashion so that the differential output appearing on a first output line 62 and a second output line 64 remains fairly constant under varying temperature conditions. The constant current source 54 is not essential, however. The constant current source 54 could be eliminated and a thermistor used in place of resistor 52 to provide for temperature compensation.

A resistor 66, a potentiometer 68, and a resistor 70 form a resistance network which may be used to adjust the differential output voltage on the conductors 62 and 64 to zero by adjusting the value of the potentiometer 68 when the input pressure is zero. However, this resistance network is optional and can be eliminated if desired.

The first output line 62 and the second output line 64 are coupled to the differential amplifier 46. First output line 62 is connected to the positive input of an operational amplifier 72 through a resistor 74. The second output line 64 is connected to the negative input of the operational amplifier 72 through a resistor 76. A resistor 78 coupled between the output and the negative input is used as a feedback resistor. A resistor 79 is coupled between the positive input and ground.

The differential amplifier 46 generates a signal on an output conductor 80 connected to the output of the operational amplifier 72. A low pass filter comprising a resistor 82 and a capacitor 84 is connected to the conductor 80. The signal on the conductor 80 is proportional to the amount of pressure sensed by the transducer 44. This signal, once filtered, carried by a conductor 85, is input to an operational amplifier 86 at the positive input. The operational amplifier 86 is used as a comparator to compare the output of the differential amplifier 46 to the output of the voltage controlled oscillator 48 carried by a conductor 87.

The VCO circuit 48 generates a triangular wave having an adjustable frequency and an adjustable offset voltage. The VCO circuit 48 includes a first operational amplifier 88 and a second operational amplifier 90. The first operational amplifier 88 includes a biasing circuit consisting of a potentiometer 92, resistors 94, 96, and 98 and feedback capacitor 100. The wiper of the potentiometer 92 is coupled to the negative and positive inputs of the first operational amplifier 88 through the resistors 94 and 96 respectively. The wiper of the potentiometer 92 controls the span of the triangular waveform. A range of about two orders of frequency can be obtained. The output of the first operational amplifier 88 is connected to the negative input of the second operational amplifier 90. The second operational amplifier 90 includes the biasing circuitry of a resistor 100 coupled to the conductor 50, a potentiometer 102, a resistor 104, and a resistor 106. The potentiometer 102 adjusts the DC voltage level of the triangular waveform.

The output of the second operational amplifier 90 is coupled to a resistor 108. The resistor 108 is coupled to the base of an NPN transistor 110 having the emitter thereof connected to ground and the collector thereof connected to one side of a resistor 112. The resistor 112 is connected to the negative input of the first operational amplifier 88 to provide negative feedback from operational amplifier 90.

An output conductor 114 of the VCO circuit 48 is connected to the negative input of the operational amplifier 86 through the conductor 87. The operational amplifier 86 compares the electrical signal proportional to pressure carried by the conductor 85 to the triangular waveform output carried by the conductor 87. A signal is generated at the output of the operational amplifier 86 which is high for a period of time whenever the pressure signal is greater than the voltage controlled oscillator signal and low for a period of time whenever the pressure signal is less than the voltage controlled oscillator signal. Thus, the signal output of the operational amplifier 86 represents a comparator signal which is carried by an output conductor 116 which connects the output of the operational amplifier 86 to the microcontroller 32 at a pin PM0 thereof.

The transducer 44 generates a voltage level which is linear with respect to the amounts of pressure being measured. By comparing the signal equivalent to pressure carried by the conductor 85 to the triangular waveform of VCO circuit 48, a voltage output signal is generated by the comparator 86. The voltage output signal generated by the comparator 86 is high for a period of time that is, therefore, directly related to the magnitude of the voltage signal generated by the differential amplifier 46. Consequently, the time period that the signal at conductor 116 is high gives an accurate indication of the amount of pressure sensed by transducer 44.

Figure 3A:
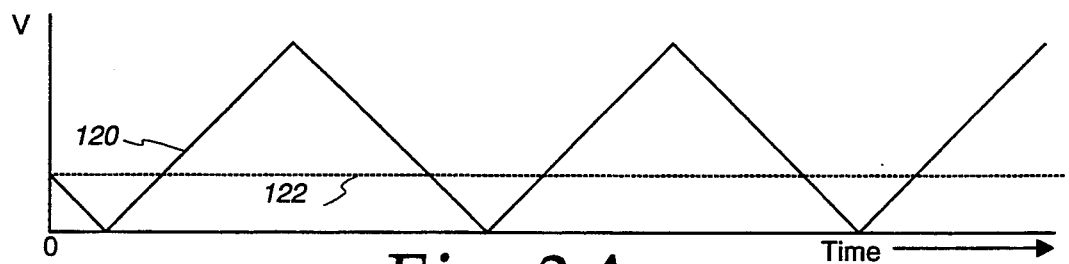
FIGS. 3A-3E are timing diagrams for signal outputs from various points in the circuitry of FIG. 2.

FIGS. 3A-3E illustrate the output of the VCO circuit 48, the: output of the pressure transducer 44, and the output of the comparator 86. As illustrated in FIG. 3A, the output of the VCO circuit is a triangular waveform 120. The line 122 represents the filtered output of the differential amplifier 46 when no input pressure is applied. As previously discussed, the present invention is extremely accurate due to the capability of making a reading when input pressure is zero, thereby negating any necessity for biasing the operational amplifier output to zero at no input pressure. As previously described, however, provision has been made for adjusting the offset from zero.

Figure 3B:
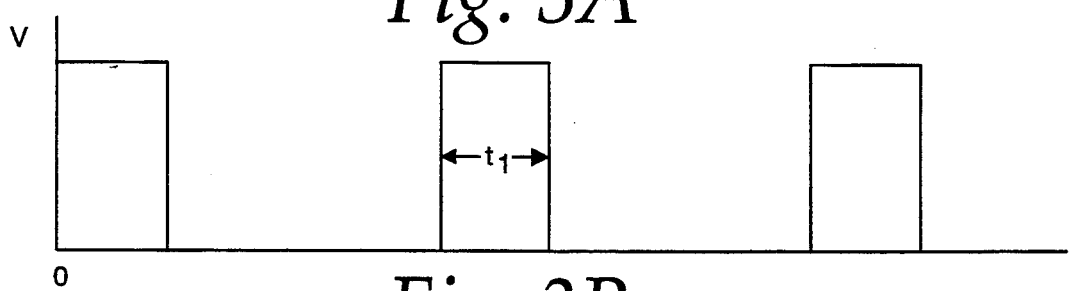
Figure 3C:
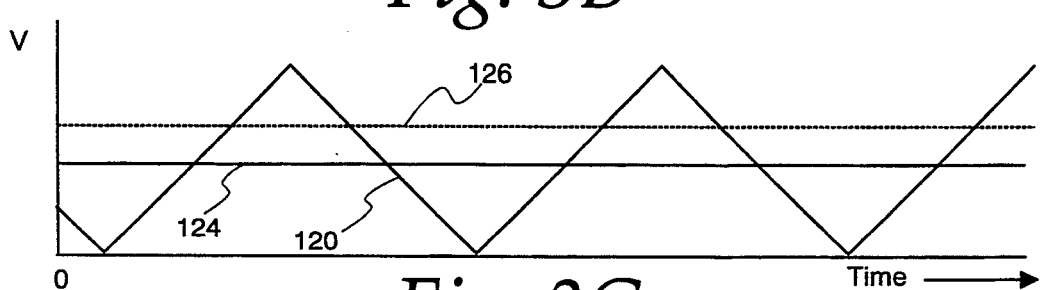
Figure 3D:
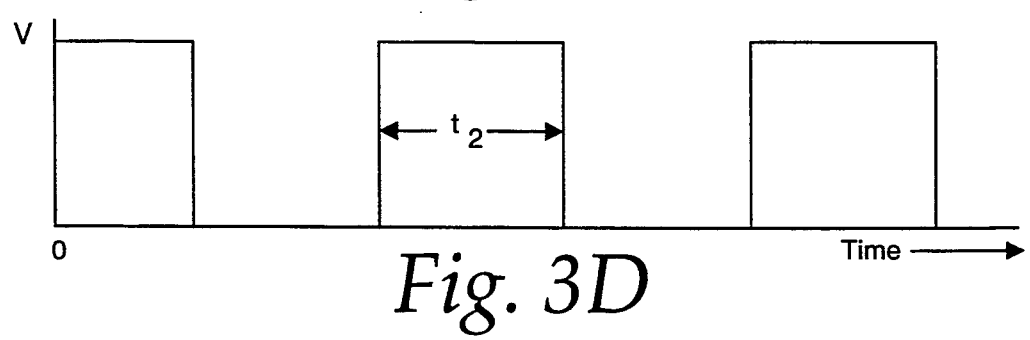
Figure 3E:
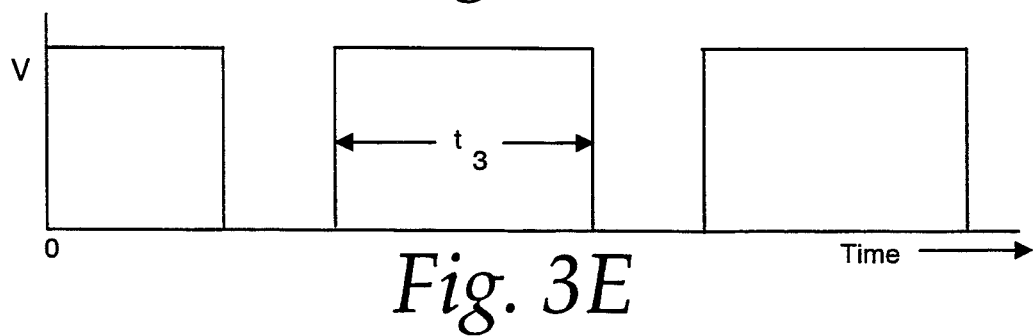

An output signal of the comparator 86 is shown in FIG. 3B. The output signal of the comparator 86 is a signal having an amplitude in volts and a time period t1, the time period being dependent on the amount of time the pressure signal is greater than the VCO signal. The time period t1 is relatively short indicating the small amount of time the line 122 (no input pressure) is greater than the triangular waveform 120. If the potentiometer 102 is adjusted to increase the DC offset of the triangular waveform, the time period T1 would be shortened. Consequently, potentiometer 102 can be used as a fine adjustment of zero. Once the pressure increases, here illustrated as the line 124 in FIG. 3C, the amount of time the pressure signal is greater than the VCO signal increases. This time period is shown as time t2 seen in FIG. 3D. T2 is greater than the time period t1, thereby indicating an increased amount of pressure. Should the measured pressure increase any further, indicated by the line 126 in FIG. 3C, the duration of the output signal of the comparator also increases as illustrated by the time period t3. Consequently, as the pressure increases, the time period of the output signal of the comparator 86 also increases. The microcontroller 32 measures this time period to generate a numerical display value indicating pressure. The LCD display 16 receives an electrical signal over the conductors 42 and 130 connecting the display to the LCD.

The microcontroller 32 operates at a certain frequency established by an oscillator 132 connected to an OSC0 pin and an OSC1 pin. The microcontroller 32 generates an internal frequency derived from the oscillator 132. This frequency is used to establish the period of bus cycle used to measure the time period of the signals appearing at pin PM0 and shown in FIGS. 3B, 3D, and 3E. The sawtooth waveform can also be used with this method.

Returning to FIG. 2, An LED 134 is controlled by the microcontroller 32 by a signal at pin PA4. The anode of the LED is coupled to a resistor 136 having the other side connected to the cathode of the transistor 40. The cathode of the LED 134 is connected to the collector of a transistor 138 having the emitter thereof connected to ground. The base of the transistor 138 is connected to pin PA4 through a resistor 140. As will be described later, in greater detail, the LED 134 is turned on at the completion of pressure reading by the microcontroller 32 to indicate that a proper reading has taken place. A buzzer 142 is connected to pins PA2 and PA3 of the microcontroller which is used to indicate certain functions as will be described later. In the present embodiment, the buzzer 142 and the LED 134 are activated at the same time by the microprocessor 32. A capacitor 144 is connected from the microcontroller 32 to ground for filtering purposes.

The present invention includes two modes of operation, the ability to read pressure in standard units of measure in three different measurement systems, and the ability to set full scale range of pressure in each of the measurement systems. A decoder 146 comprised of a plurality of microswitches and resistors is used to select the modes of operation and units of measure. Each of the plurality of switches is connected to a pin on the microcontroller 32 as follows: PM1, PM2, PM3, PM4, PM5, and PM6. The following table, Table 1 illustrates the setting of each switch to select the available modes of operation, units of measure, and full scale ranges.

TABLE 1

| | Decoder definition | | | | | |
|---|---|---|---|---|---|---|
| | PM1 | PM2 | PM3 | PM4 | PM5 | PM6 |
| normal operation | 1 | X | X | X | X | X |
| test or calibration | 0 | X | X | X | X | X |
| PSI unit | 1 | 1 | X | X | X | X |
| Kpa unit | 1 | 0 | 1 | X | X | X |
| Kg/cm**2 unit | 1 | 0 | 0 | X | X | X |
| full scale range, 60 PSI | 1 | 1 | X | 1 | X | X |

TABLE 1-continued

| | Decoder definition | | | | | |
|---|---|---|---|---|---|---|
| | PM1 | PM2 | PM3 | PM4 | PM5 | PM6 |
| full scale range, 120 PSI | 1 | 1 | X | 0 | X | X |
| full scale range, 4 BAR | 1 | 0 | 1 | X | 1 | X |
| full scale range, 8 BAR | 1 | 0 | 1 | X | 0 | X |
| full scale range, 4.00 Kg/cm**2 | 1 | 0 | 0 | X | X | 1 |
| full scale range, 8.00 Kg/cm**2 | 1 | 0 | 0 | X | X | 0 |

1: logic high
0: logic low
X: don't care

Figure 4A:
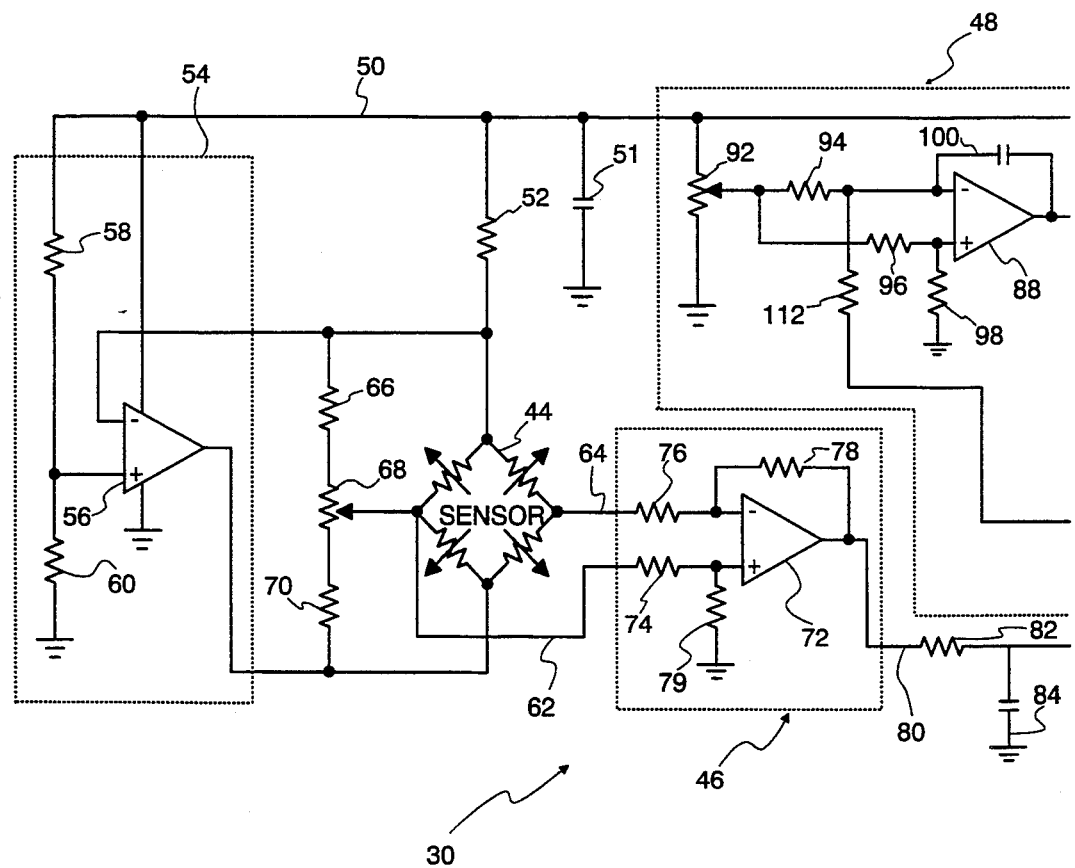
FIGS. 4A and 4B are schematic diagram similar to that shown in FIG. 2 wherein a solar cell is used as a power source rather than a battery.
Figure 4:
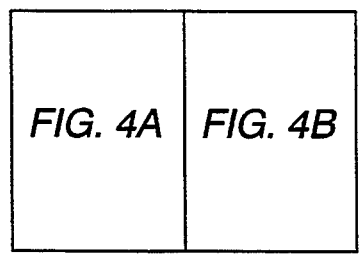
FIG. 4 shows the relative locations of the circuits of FIGS. 4A and 4B.
Figure 4B:
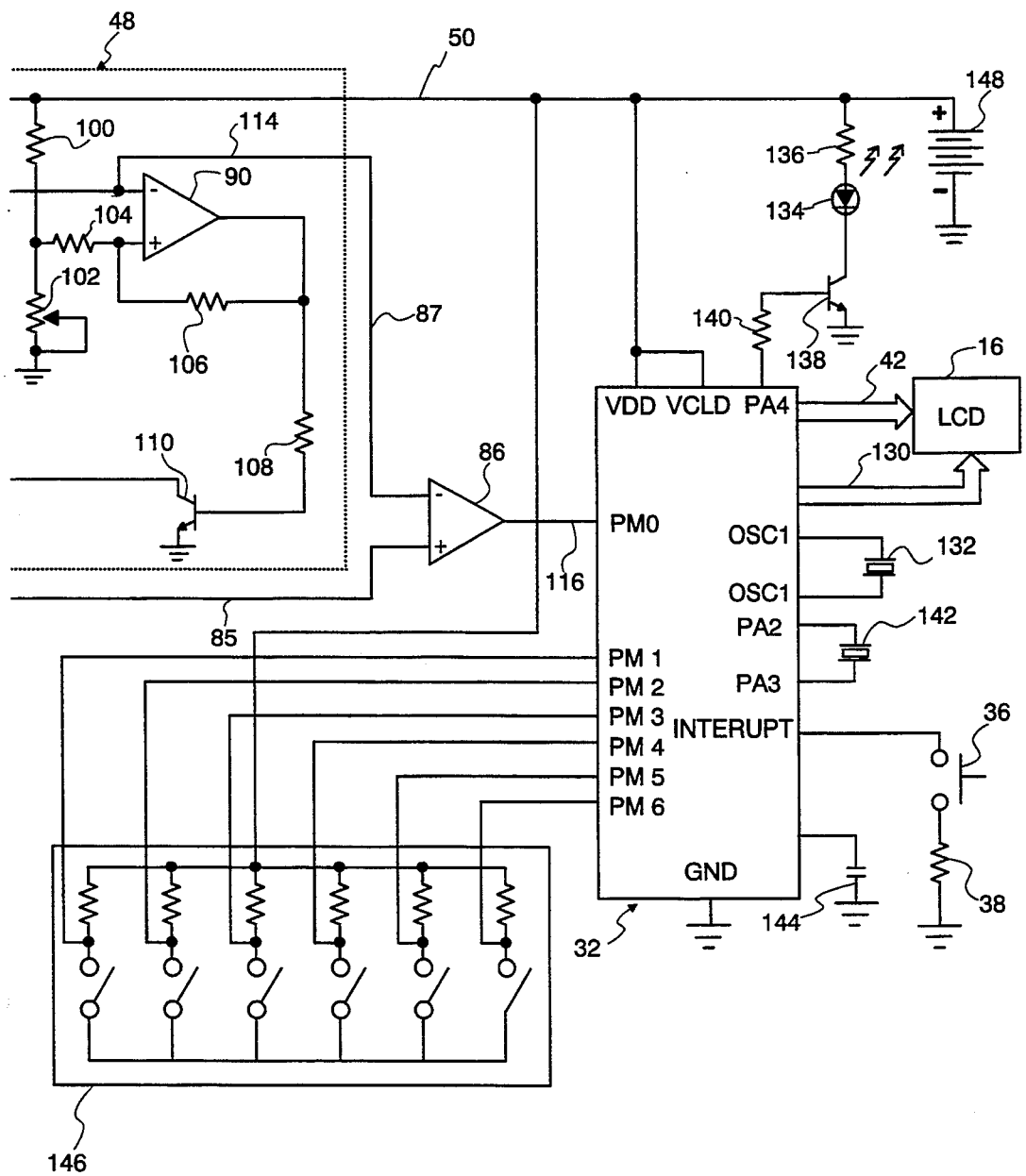
Figure 8:
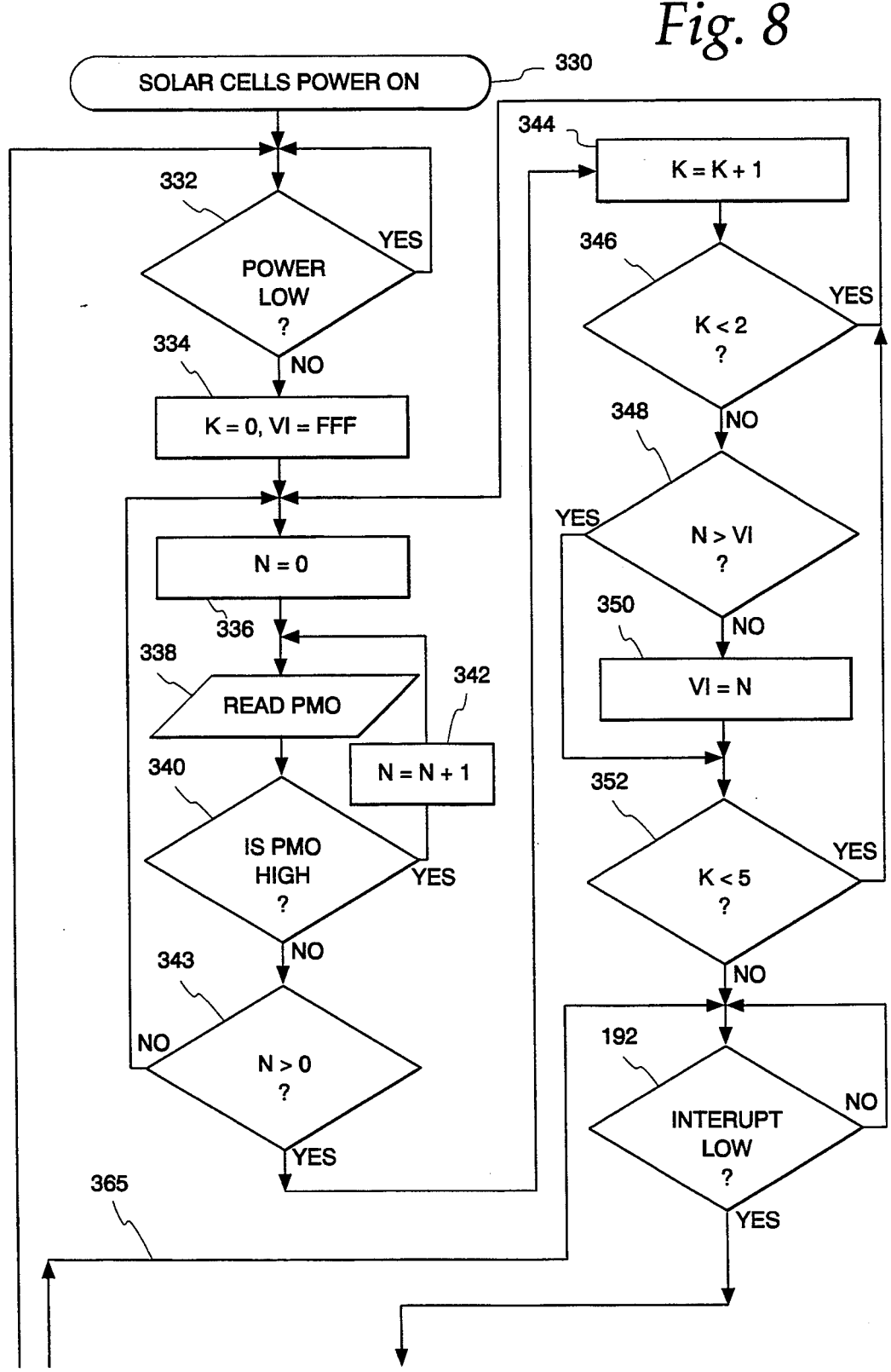
FIG. 8 is a flow chart showing firmware used when solar cells are emerged for powering an embodiment.
Figure 9:
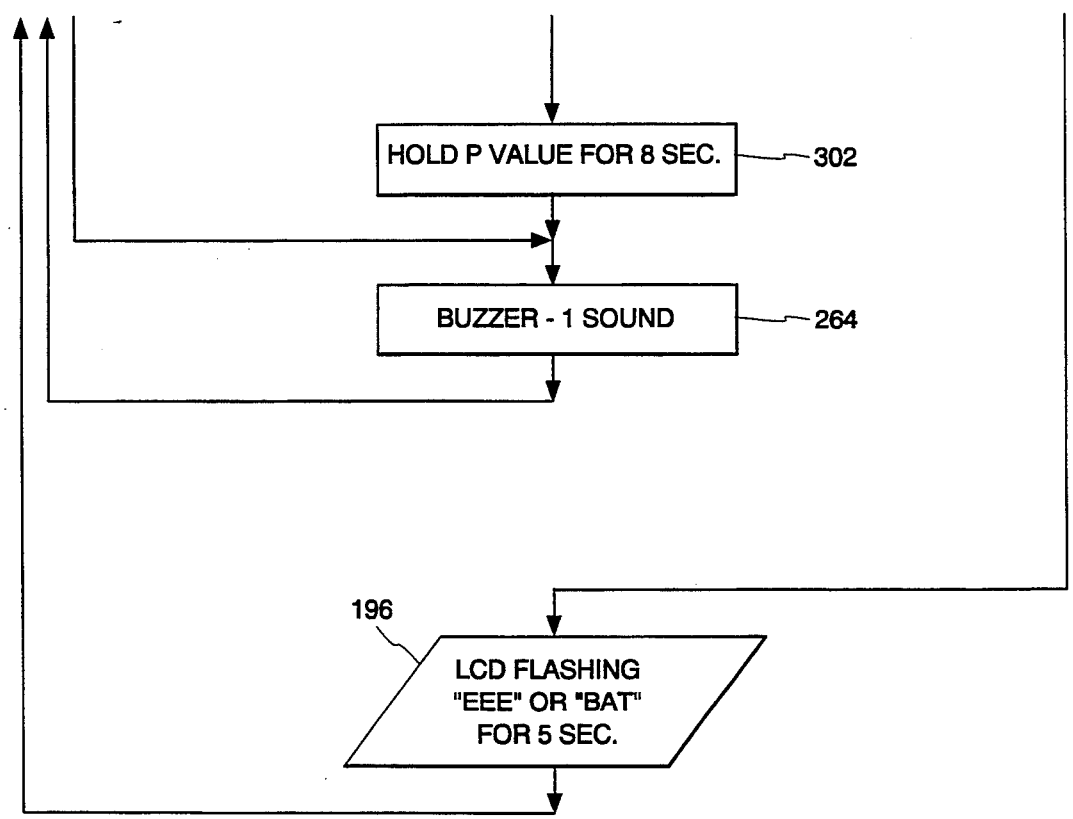
FIG. 9 is a flow chart showing remaining changes to the flow chart of FIG. 7C for solar power use.

FIG. 4 illustrates a second embodiment of the circuitry of the present invention which uses a solar cell 148 as a source of power instead of the battery supply 34 illustrated in FIG. 2. In this embodiment, the solar cell 148 supplies power to the entire circuit whenever there is sufficient light. Consequently, the circuitry of FIG. 4 is the same as illustrated in FIG. 2 except that the transistor 40 and the resistor 42 are deleted and the conductor 50 is connected directly to the solar cell 148. The microcontroller 32 is also programmed differently and this will become apparent as shown in FIGS. 8 and 9.

Figure 5A:
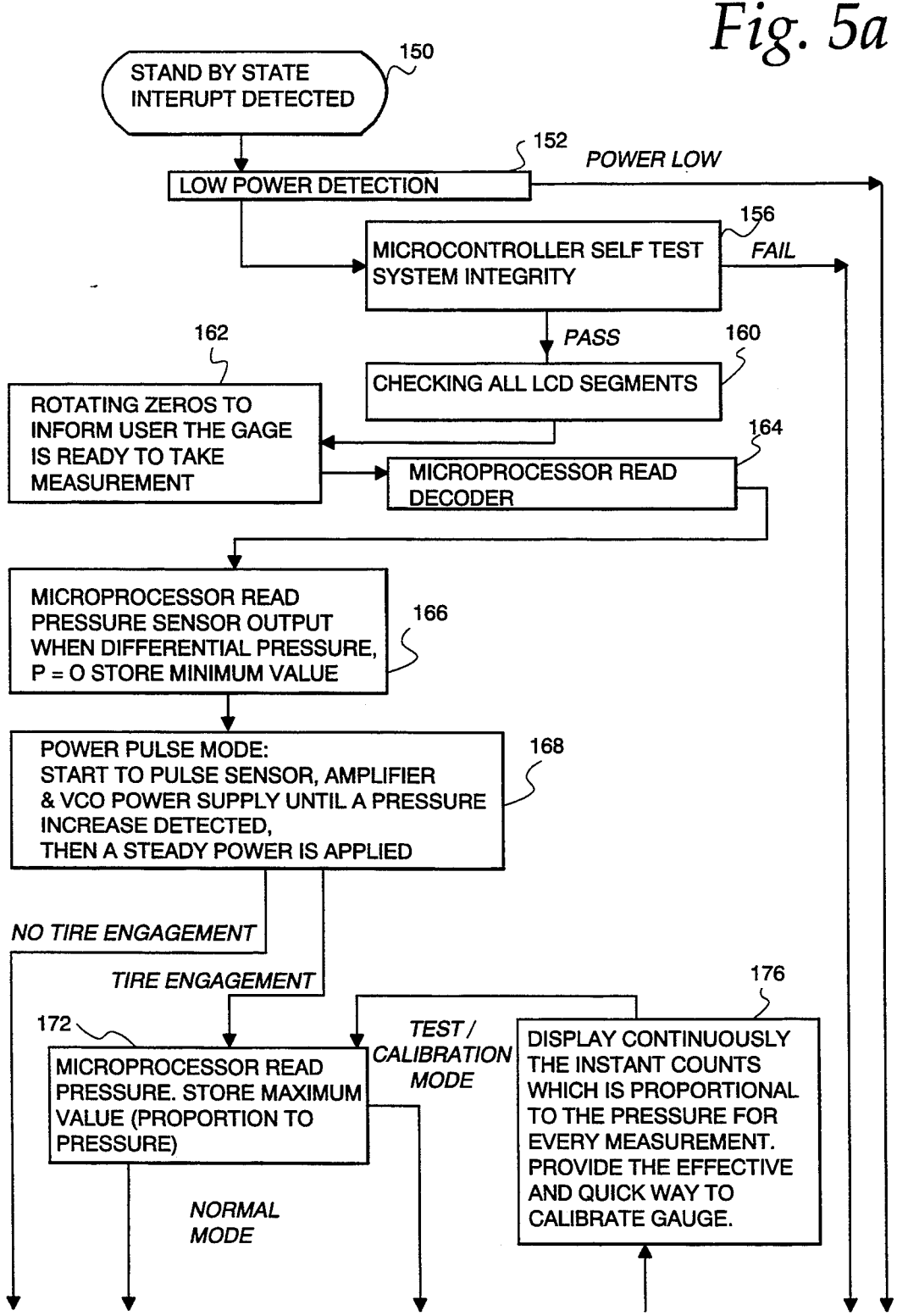
FIGS. 5A and 5B are flow charts showing the major tasks performed in firmware by the hand-held tire gauge.
Figure 5B:
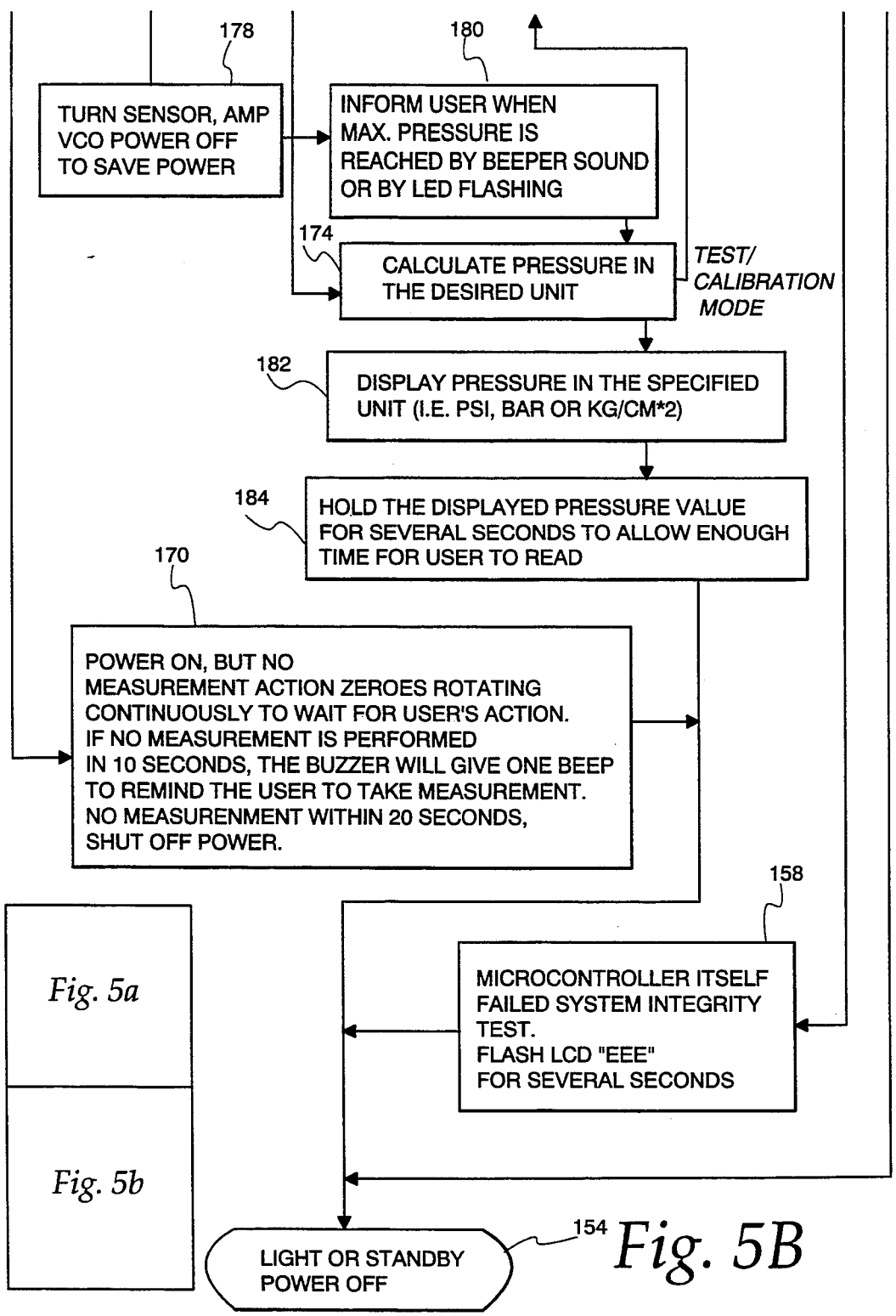

FIGS. 5A and 5B are a flow diagram illustrating the major tasks performed by the microcontroller 32 during the execution of the firmware programmed into the ROM or program memory means of the microcontroller 32. Initially, at step 150 the button 24 is depressed thereby causing the switch 36 to close pulling the interrupt pin to cause the microcontroller 32 to begin operation. At step 152, the microcontroller 32 checks the voltage level of the power source (either the battery or the solar cell) to determine if enough power is present to make a pressure reading. If not enough power is present, the microcontroller 32 powers the LCD 16 with the available power over the conductor 42 and sends signals over the conductor 130 to flash either "EEE" or "BAT" or some other indication that the battery is low. If the battery is low, the microcontroller proceeds to step 154 on FIG. 5B, thereby turning the power off to the LCD display 16.

If however, the power is not low, the microcontroller 32 performs a self test to test the integrity of the microcontroller system at step 156, as would be understood by one skilled in the art. If the self test fails, the LCD 16 displays the "EEE" or some other error signal at step 158 indicating the microcontroller is not operating correctly. Once the error signal has been displayed, the microcontroller removes power from the LCD at step 154.

If the microcontroller, however, passes the self test, at step 160, the microcontroller lights all segments of the LCD display 16 digit by digit. The user watches the display to determine whether the segments for each digit are properly lit. If segments of the display fail this test, the power is removed from the display at step 154 due to the operator discontinuing any measurement.

If the display segments are operating properly, the microcontroller 32 generates signals on the display which indicate to the user that the gauge is ready to take a measurement. In the present embodiment, a single segment in each digit is energized one at a time. The left digit has the segments lit one at a time in a counterclockwise fashion and the right digit has the segments lit one at a time in a clockwise fashion. Consequently, the display appears to be rotating, outlining a zero in each digit as shown at step 162.

Once the microcontroller 32 is ready to take a measurement as indicated by the display, the microcontroller 32 reads pin PM1 to determine the state of the switch of the decoder 146 connected to pin PM1. Once the pin PM1 is read, the microcontroller 32 internally sets the device to operate in the measurement mode or the test mode, the system of measurement, and the maximum pressure value which can be measured.

After reading the decoder at step 164, the microprocessor reads the pressure sensor output at step 166 as indicated by the signal at pin PM0 of the microcontroller 32 when there is no input pressure. The reading at this point is stored thereby establishing a value indicating no input pressure. The stored value is used to determine the value of sensed pressure.

At step 168, the microcontroller 32 enters a mode called the power pulse mode. The power pulse mode is a mode where the pin PA1 is pulled low for a short period of time and then allowed to float at high impedance, also called tri-state. By pulsing the pin PA1, the transistor 40 is turned on and off thereby causing the power to be delivered from the power supply 34 to the current supply 54, the pressure transducer 44, the differential amplifier 46, the VCO circuit 48 and the comparator 86 for short periods of time until pressure is sensed by the pressure transducer 44 and read by the microcontroller at pin PM0 or the gauge shuts itself off. By pulsing the power supplied to each of these individual circuits until pressure is sensed, battery power is saved. Of course, if the solar cell 148 used in place of the battery then power pulsing is not used.

Figure 6A:
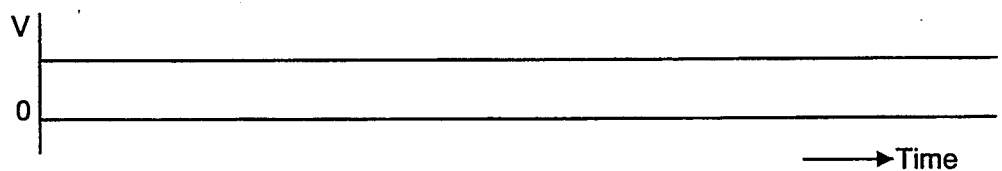
FIGS. 6A-6E are timing diagrams of the battery power, including power pulsing applied to various portions of the hand-held tire gauge circuitry.
Figure 6B:
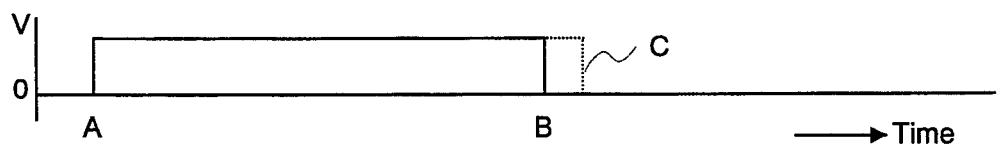

FIGS. 6A through 6E illustrate the battery power including power pulsing as it is applied to various portions of the circuit. FIG. 6A illustrates the battery power supplied to the microcontroller 32. As illustrated, the battery power, V, is always applied to the microcontroller 32. In FIG. 6B the power supplied to the display is illustrated. At point A upon depression of the button 24, the battery power is applied to the display 16 and is continuously supplied until one of two event occurs. If a pressure value is read correctly, the battery power is removed from the display 16 at a point B after a certain period of time has elapsed. If however, no pressure is sensed after a certain period of time, the power is removed from the display 16 at a point C.

Figure 6C:
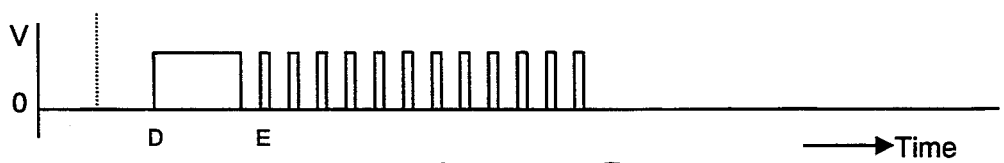
Figure 6D:
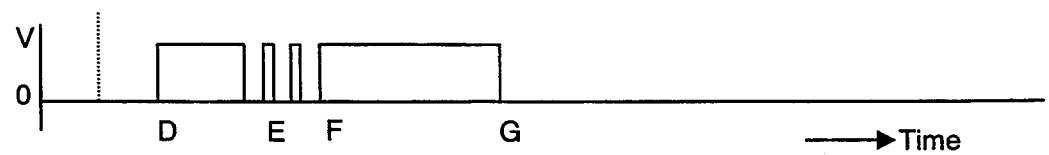

FIG. 6C illustrates the battery power supplied to the pressure transducer 44, the amplifier 46, and the VCO circuit 48. Initially at point D, the battery power is supplied to these circuits for a short period of time to make a measurement of the pressure at no input pressure. Once this measurement is made, at point E, the power pulse mode begins and continues until twenty seconds has elapsed or tire engagement occurs delivering pressure to the pressure transducer 44. As shown, in FIG. 6D, the power pulse mode lasted for two pulses beginning at point E, but at point F, tire pressure is sensed, the power pulse mode ends and power is supplied to the sensor, amplifier, and the VCO circuit. Once maximum tire pressure is sensed as point G, the power is removed from the circuitry except for the microcontroller 32 and the display 16 for display of the measured pressure.

Figure 6E:
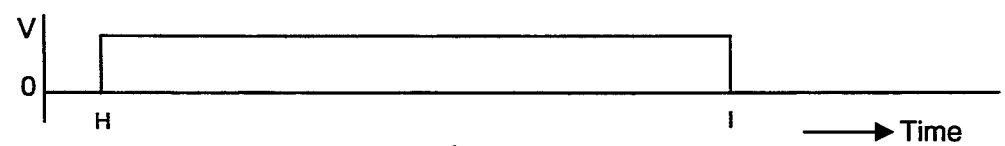

FIG. 6E simply shows the power for the embodiment using the solar cell 148 as a power source. As illustrated, all circuits receive power whenever there is sufficient light to cause the solar cell to generate power as shown at point H. At point I, no power is applied to any circuit as insufficient light exists for the solar cell to generate power.

Returning to step 168 of FIG. 5A, the gauge is operating in the power pulse mode waiting for sensed pressure. At step 170 on FIG. 5B, if no pressure is sensed, the power pulse mode continues and the display shows zeroes rotating thereby indicating that the gauge is ready to make a measurement. If no measurement is performed in 10 seconds, the buzzer 142 sounds. If no measurement is taken within 10 additional seconds for a total of 20 seconds, the power is removed from the amplifier, the sensor, and the VCO circuit at step 154. These time periods are not critical.

If pressure is sensed, at step 172, the microprocessor reads the pressure and stores a maximum value. At this point, the microprocessor 32 checks to determine whether the decoder has been set to place the gauge in the test/calibration mode or in the normal pressure reading mode. If the gauge is in the test/calibration mode, at step 174 the pressure is calculated in the desired units as selected by the decoder. Once the pressure is calculated in the desired units, at step 176, the display continuously displays the instant counts which is proportional to the pressure for every measurement. The number or instant counts for a certain pressure can be adjusted to thereby provide a quick and easy way to calibrate the gauge. After calibration, the microprocessor 32 returns to step 172 and continues in either the test/calibration mode or the normal mode.

If the decoder is set to the normal mode, the maximum value is stored at step 172 and at step 178, the power to the pressure transducer 44, the VCO circuit 48, and the differential amplifier 86 is removed to save power. At step 180, the user is informed that the maximum pressure has been determined and the microprocessor alerts the user by sounding the beeper 142 or by flashing the LED 134. Once the user is alerted, the pressure is calculated in the desired units at step 174 as set by the decoder 146.

At step 182, the pressure is displayed in the appropriate units and is displayed, at step 184, for period of time long enough to enable the user to read the value of pressure, typically a few seconds. After the time for displaying the value of pressure has elapsed, the power is removed from the LCD display at step 154.

Figure 7A:
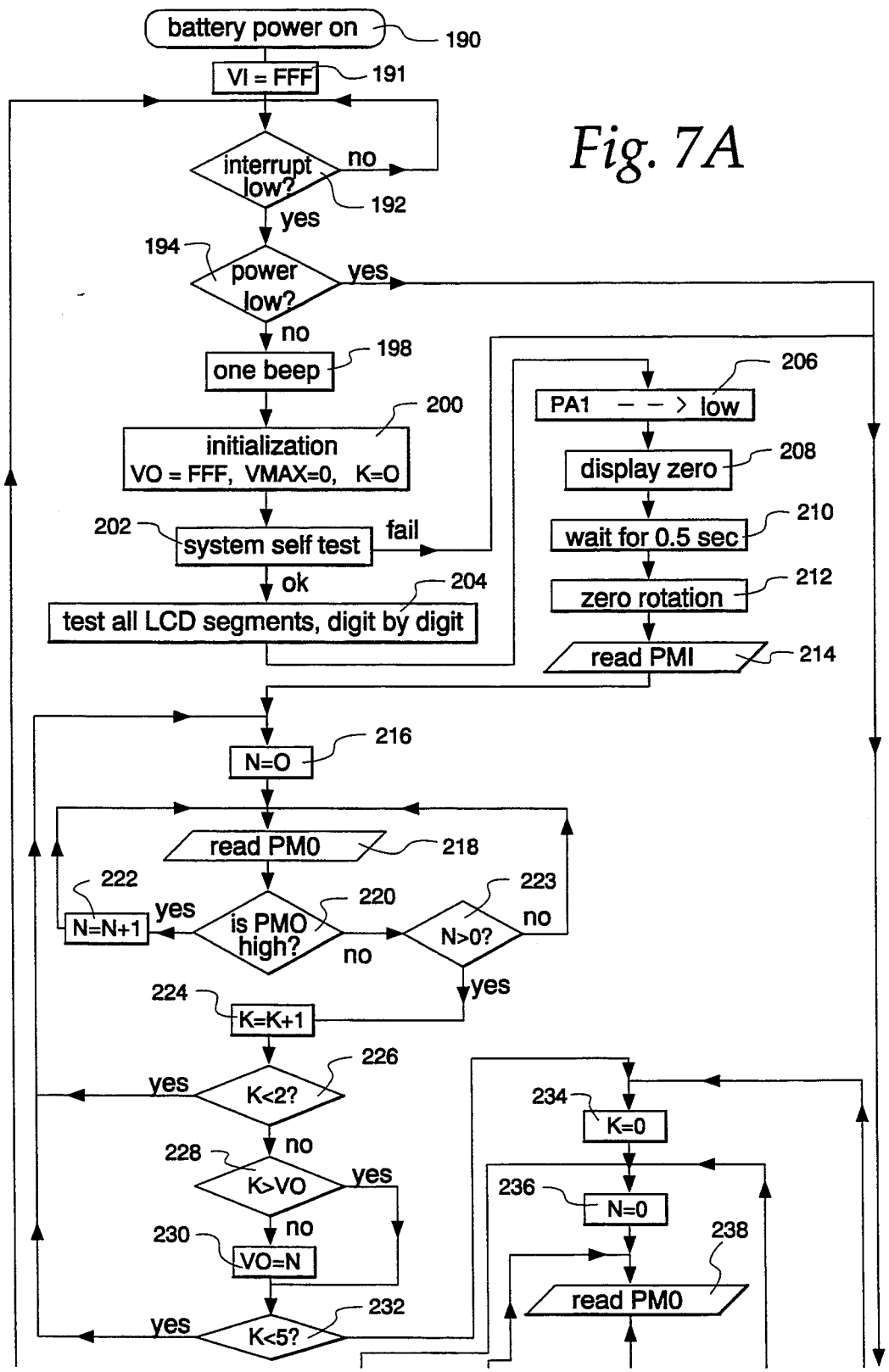
FIGS. 7A-7C are flow charts showing the operation of firmware.
Figure 7B:
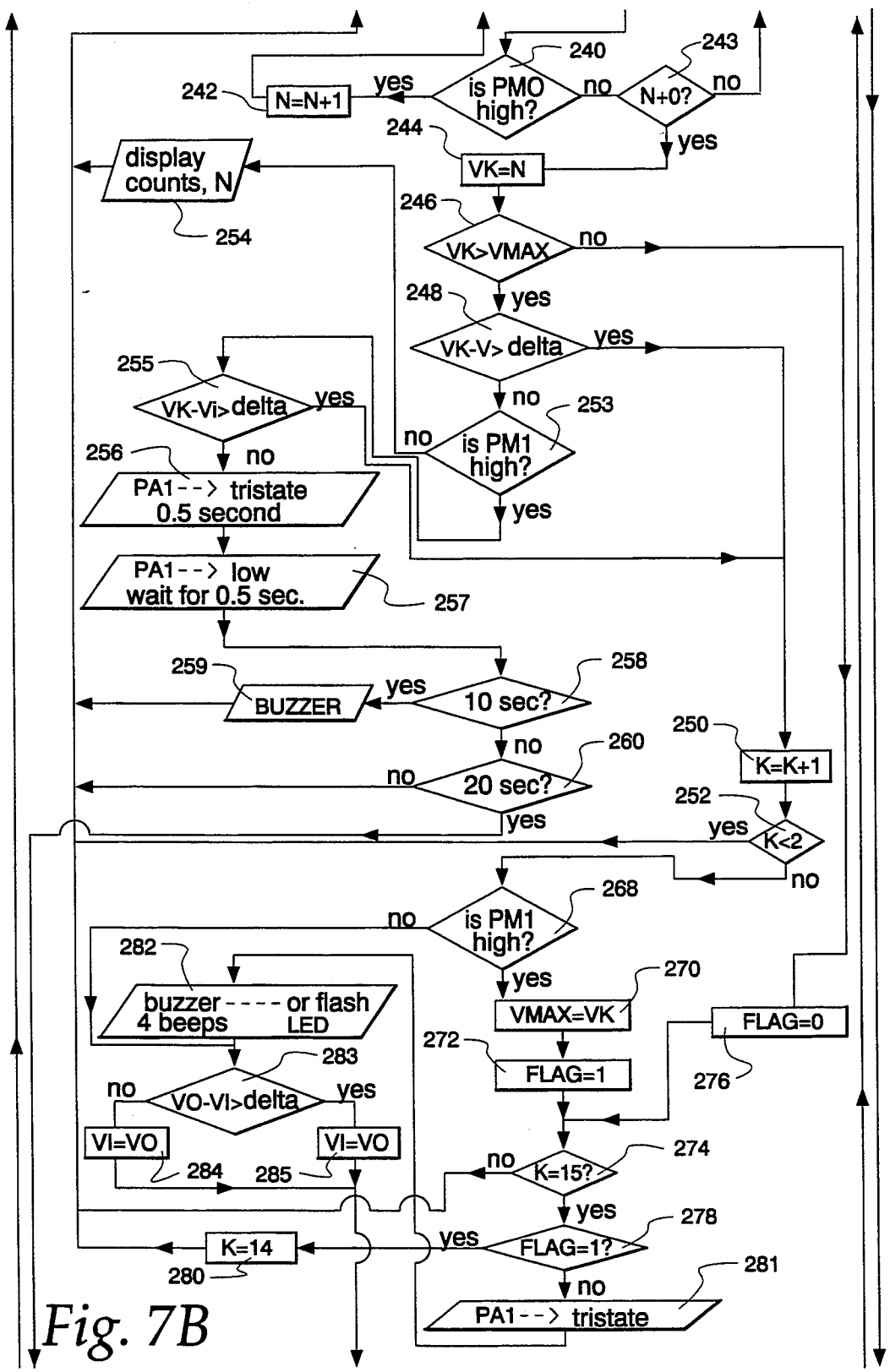
Figure 7C:
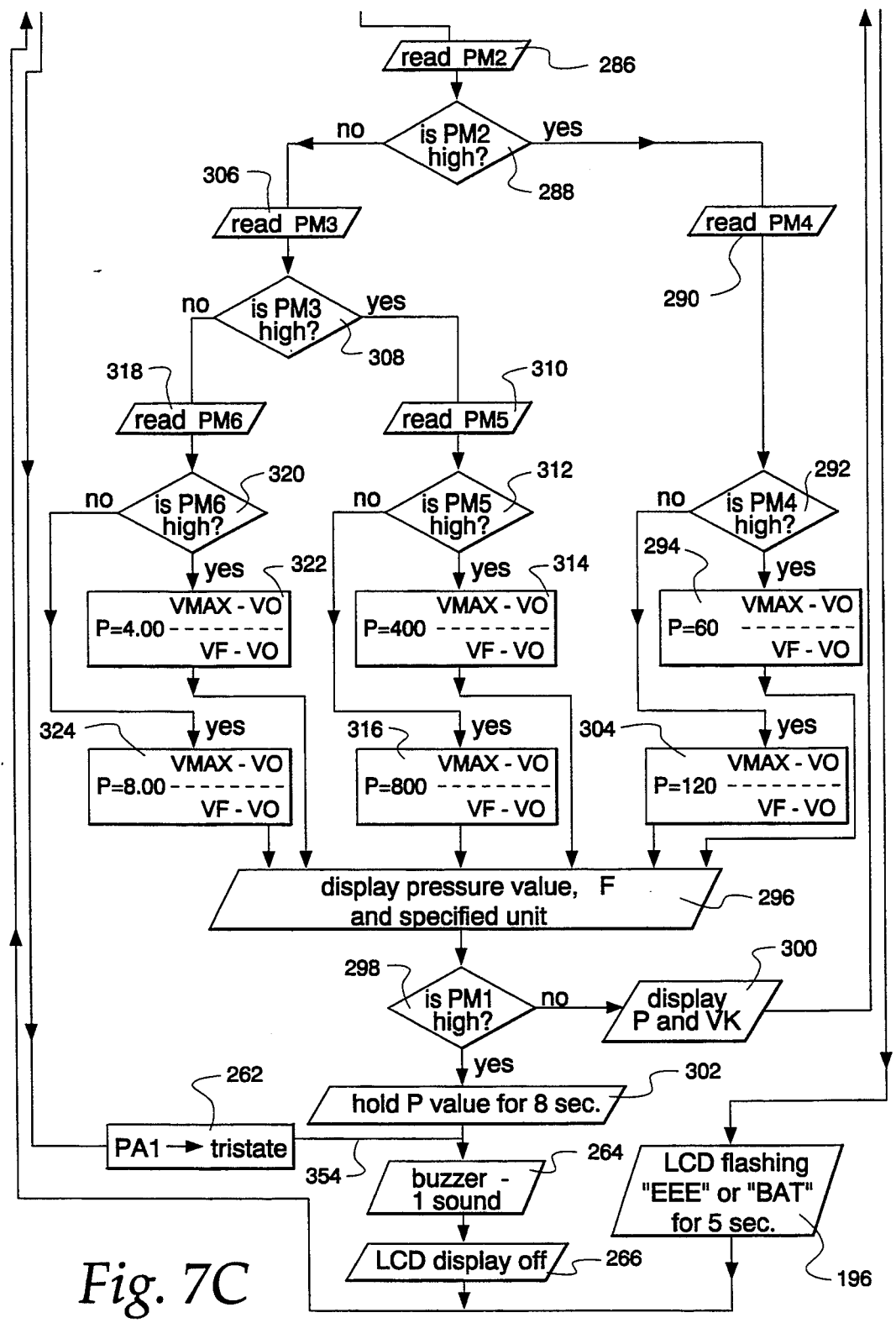

FIGS. 7A, 7B, and 7C are a flow diagram illustrating the operation of the microcontroller 32 under control of the firmware contained in the read only memory or program memory. The microcontroller 32 is programmed in microcode as is understood by one skilled in the art according to the flow diagram of FIGS. 7A, 7B, and 7C. Step 190 indicates that the battery power to the microcontroller 32 is always on and that the microcontroller 32 operates in a standby mode to conserve battery power. At step 191, a variable VI is set equal to FFF. Each described variable is made equivalent to a value which is stored in random access memory or a register. The variable VI is used to store the last value of an initial reading, VO, which is a value determined before the gauge is sensing pressure. At step 192, the microcontroller 32 begins operation if the interrupt pin is pulled low by depression of the switch 36. If the interrupt pin is pulled low, at step 194, a check is made to determine whether the power is low. If it is determined that the power is low, at step 196 of FIG. 7C, the LCD display 16 flashes an indication such as "BAT" for five seconds to indicate to the user that the power is insufficient. This check is also made when the solar cell 148 is used in place of the battery 34. Power is considered low when the microcontroller 32 cannot operate correctly. This is typically less than three volts.

If the battery power is not low, at step 198, the beeper 142 beeps once to indicate that the power is on and that a pressure reading can be attempted. Once step 198 has been completed, three variables are initialized at step 200 for later calculations. The V0 variable is set to FFF. A VMAX variable is set to zero and is used for the current maximum pressure sensed. A K variable used to count the number of measurements is set to zero.

Once these variables have been defined, the microcontroller 32 performs a self test at step 202. This is a standard self test used to test the operation of the microcontroller as would be understood by one skilled in the art. If the microcontroller 32 fails the self-test, the LCD flashes an appropriate error warning such as "EEE" for five seconds at step 196 at FIG. 7C. If, however, the self test is acceptable, at step 204, all the LCD segments are tested digit by digit as previously described.

At step 206, pin PA1 is pulled low, by the microcontroller 32, thereby turning on the transistor 40 and applying power to the transducer 44, the amplifier 46, and the VCO circuit 48. Once pulled low, at step 206, a zero is displayed at step 208 for one-half of a second at step 210 after which zeros are rotated at step 212. The rotation of zeros indicates to the user that a pressure reading can now be made. At this time, the microcontroller 32 reads pin PM1 at step 214 to determine whether the decoder 146 has been set to cause the circuitry to operate in the test mode or the normal mode. After reading pin PM1, a variable N is set equal to zero at step 216. The variable N is used to count the number of bus cycles occurring during a high output of the comparator 86. Once set to zero, pin PM0 is read at step 218 to determine the output level of the comparator 86. If as determined at step 220, the comparator output is high, then the number of bus cycles that the comparator output is high is counted at step 222 and through the loop of steps 218 and 220.

If the comparator 86 output is not high, a step 223 scans the comparator 86 output continuously until it goes high, as soon as N is zero. When N is greater than zero, then microcontroller 32 at step 224 increments the variable K by 1. The variable K is used in step 224 to count the number of times a reading at zero input pressure is made. Initially, this is done twice, as determined at step 226, so that the first measurement is not used in any calculations since it is likely to be inaccurate, as for instance in FIGS. 3A and 3B in which the initial measurement would be a partial one. Once K is two, then at step 228, the number of bus cycles, N, is compared to the value of V0 which was initially set to FFF at step 200. If N is not greater than V0 as determined at step 228, then V0 is set to N at step 230. If however, the value of N is greater than V0 then the variable K is checked at step 232 to determine if it is less than five. If less than 5, then N is reset to zero at step 216 and a calculation for N begins again. By checking to see whether the N is greater than V0 at step 228, a check is made to search for the number of minimum counts of bus cycles to determine whether the reading at zero input pressure when the tire gauge is not engaged is actually the minimum. Once the variable K is equal to or greater than 5 as determined at step 232, then the reading for zero input pressure is stored as the value of variable V0.

After determining the value of zero pressure, the variable K is set equal to zero at step 234 and the variable N is set equal to zero at step 236 to begin measurement of actual tire pressure. Pin PM0 is read at step 238. At step 240, PM0 is checked to see if it is high. If not, at step 243 the read PM0 loop will continue as long as N is zero. If so, at step 242, the value of N is incremented by one to calculate the length of time that the pin PM0 is high. Once PM0 is not high, at step 244, the variable VK is set to N. The value of VK is the instantaneous pressure currently being measured.

Step 246 begins a sequence of steps to determine the maximum pressure value by searching for a maximum value of VK by comparing the value of VK to the variable VMAX. At step 246, the value of VK is compared to the variable VMAX which was previously set to zero at step 200. At step 246, the first time that VK is compared to VMAX, VK will be greater than VMAX since VMAX was previously set to zero. Since VK is greater than VMAX, at step 248, V0 is subtracted from VK to determine whether the difference is greater than a variable delta. Delta is a preset variable set to a very small value, such as 0.1 PSI, which can correspond to 1, 2, or 4 counts of the bus cycle, depending on the frequency of the crystal oscillator used. If VK−V0 is greater than delta, then at step 250, the variable K is incremented by one. If K is less than 2 as determined at step 252, then the program returns to step 238 to read the pin PM0 again. This step is performed to ignore any first measurement of the comparator 86 output at pin PM0 which may be inaccurate.

If, however, it is determined at step 248 that VK−V0 is less than or equal to delta, thereby indicating that the tire gauge is not engaged to the valve stem of the tire, then pin PM1 is checked at step 253 to determine if the gauge is in the normal mode or the test mode. If PM1 is not high, the gauge is in the test mode and the number of display counts, N, are displayed on the LCD 16 for calibration at step 254. Calibration is made by adjusting resistor 92 and/or resistor 102 of the VCO circuit 48. The routine then returns to step 236. If PM1 is high, however, the difference VK−VI is calculated and checked to see if the difference is greater than delta at step 255. Step 255, like step 248, checks to see if the pressure reading stored in VK is high enough to indicate that tire pressure is being measured. In this step, however, VI (the previous value of V0) is used instead of V0 in the event that the tire gauge is engaged to the valve stem before the pushbutton is pressed.

Pin PA1 is allowed to be in the tri-state mode or high impedance mode at step 256 for a period of 0.5 seconds which prevents the transducer 44, amplifier 46, and VCO circuit 48 from receiving power. After 0.5 seconds, the pin PA1 is pulled low for 0.5 seconds thereby delivering power to the sensor, amplifier, and VCO circuit at step 257. At step 258, a check is made to determine whether a timer counting the time since the button was first depressed has counted 10 seconds. If it has, then a buzzer is sounded at step 259 to remind the user that a measurement can be made. If the timer is not at 10 seconds, a check is made at step 260 to determine if the timer is equal to 20 seconds. If not, the microprocessor returns to step 236.

As long as VK−V0 is not greater than delta at step 248 or VK−VI is not greater than delta at step 255, the power continues to be pulsed on and off for a period of up to 20 seconds. If 20 seconds elapses without VK−V0 or VK−VI being greater than delta, then proceeding from step 260, the microprocessor 32, at step 262 sets pin PA1 to the tri-state mode, thereby removing the power from the transducer 44, the amplifier 46, and the VCO circuit 48. At step 264, the buzzer is sounded to inform the user that the power to these circuits is now removed and that a pressure measurement can no longer be made unless the button 24 is depressed. Power is also removed from the LCD display 16 at step 266. The microcontroller then returns to the standby mode at step 190.

If at any time during the 20 second time period which is monitored at step 260, it is determined that VK−V0 or VK−VI is greater than delta, then readings of the pressure are made until the microcontroller 32 determines that a maximum value of pressure has been read and that the pressure can be displayed on the LCD 16.

As previously described, the variable K is incremented by one at step 250 and the first reading is ignored by checking to see if the variable K is less than 2 at step 252. Once K is equal to 2 or greater than 2, then the pin PM1 is checked at step 268 to determine if it is high thereby indicating that the sensor is sensing some pressure. If it is high, the variable VMAX is set equal to VK at step 270. A variable FLAG is set to 1 at step 272. Once the variable FLAG has been set to 1, the variable K is checked to determine if it is equal to 15 at step 274. If not, then the routine proceeds back to step 236 to begin a new measurement. By checking to see if the variable K is equal to 15, the microprocessor reads a value of pressure 15 times to ensure that the pressure is being measured accurately. It is assumed that 15 reads of pressure yield an accurate pressure reading, however, more or fewer than 15 readings can be made.

If VK is not greater than VMAX as determined at step 246, then a variable FLAG is set to 0 at step 276. When FLAG is set to zero it indicates that the most recent value of VK has not changed from the previously read value of VK which is VMAX and that the pressure reading has stabilized. If it is determined that K is equal to 15 at step 274 indicating that sufficient readings of pressure have been made, then at step 278, the variable FLAG is checked to determine if it a one. If it is a one, this indicates that the value of VK is still changing and additional readings of pressure are to be made. Consequently, the variable K is set to 14 at step 280 and the microcontroller 32 returns to step 236 to make another reading. If, however, FLAG is not equal to 1, the variable VK contains a value which is used in a calculation to determine measured pressure. Now that measured pressure can be displayed, the pin PA1 is set to tri-state at step 281, thereby removing power from the sensor, amplifier, and VCO circuit.

At step 282, the microcontroller 32 signals the user that a pressure reading is complete by either causing the buzzer to beep or by flashing the LED 134. Once the user is signaled at step 282 or it is determined that PM1 is not high at step 268, then at step 283 a check is made to determine if V0−VI is greater than delta. This check is made to update the values of VI and V0, if necessary, depending on whether a reading has been made previously with no input pressure. If V0−VI is not greater than delta, then this result indicates that the button 24 was depressed before the tire gauge was connected to the valve stem and that a new value of V0 exists. Consequently, at step 284, VI is set equal to V0, thereby updating the value of VI. If, however, V0−VI is greater than delta, then at step 285, V0 is set equal to VI (the previous value of V0), thereby indicating that the tire gauge and tire were engaged prior to depression of the button 24.

Once step 284 or 285 are completed, at step 286 of FIG. 7C, pin PM2 is read. If at step 288 it is determined that the pin PM2 is high indicating that the pressure reading is to be displayed in pounds per square inch units, then at step 290, pin PM4 is read. At step 292, a check is made to determine which full scale range is being used to display the pressure reading. If it is determined that PM4 is high, then the full scale range of 60 PSI is being used as determined by the decoder 146 definitions in Table 1.

At step 294, the microcontroller calculates the amount of pressure in PSI units. The pressure in PSI units is calculated by taking the difference between VMAX and V0 and dividing the result by the difference between VF and V0. VF is a fixed value of between approximately 2000 and 4000 counts depending on the frequency of the crystal oscillator. Once the value of pressure is calculated, the pressure value is displayed at step 296 and the specified units are also displayed.

Once pressure is displayed, pin PM1 is checked at step 298 to see if the microcontroller 32 is operating in the test mode or the normal measurement mode. If in the test mode, at step 300, the value of P and VK are displayed. VK can also be displayed continuously as it is updated, thereby displaying instantaneous pressure. After display, the microcontroller returns to step 234 at FIG. 7A and proceeds as previously described.

If, however, the microcontroller 32 in the normal mode, the value of pressure is displayed for 8 seconds at step 302 or for a sufficient time to enable the user to read the displayed value. Once displayed, the buzzer is sounded at step 264, the LCD display is turned off at step 266, and the microcontroller 32 returns to the standby mode waiting for an interrupt at step 192.

When PM4 is not high, indicating that the full scale range is 120 PSI, as checked at step 292, then at step 304 the pressure is determined in PSI by finding the difference between VMAX and V0, dividing that difference by the difference of VF and V0 and multiplying that result by 120. Again, once the pressure has been determined in PSI, the value is displayed at step 296 as before. Once displayed, steps 302, 264, and 266 are completed. Upon completion, the microprocessor 32 returns to the standby mode.

The digital tire gauge also displays pressure in Kpa and Kg/cm**2 units. If it is determined that PM2 is not high at step 288, then PM3 is read at step 306. If PM3 is high, as determined at step 308, thereby indicating that a reading in Kpa units will be displayed, then at step 310, PM5 is read to determine which maximum scale will be read. If PM5 is high, as determined at step 312, then the equation, P=400 [(VMAX−V0)/VF−V0)], is used to determine the value of pressure in Kpa units having a full range scale of 4 BAR, at step 314. If PM5 is not high, then the equation at P=800 [(VMAX−V0)/(VF−V0)] is used to determine the full range scale of 8 BAR, at step 316. Once the values of pressure are calculated with one or the other equation, the pressure is displayed at step 296 and the firmware of the microcontroller 32 continues as described before.

If it is determined at step 308 that PM3 is not high indicating that the pressure will be displayed in Kg/cm2, then PM6 is read at step 318. At step 320, if PM6 is found to be high, then the full scale range for Kg/cm2 of 4.00 is used. At step 322, the equation P=4.00[(VMAX−V0)/(VF−V0)] is used to determine the value of pressure. If PM6 is not high, then the equation P=8.00[(VMAX−V0)/VF−V0)] is used at step 324 to determine the pressure and having a maximum full scale range of 8.00. Once the value of pressure is determined, then at step 296, the pressure is displayed. After step 298, the remainder of the program is performed as before.

As previously described with regards to FIG. 4, the present invention includes a solar powered electronic circuit for measuring air pressure. For the solar powered circuit, the microcontroller 32 includes a similar to that described in the flow chart of FIG. 7, but slightly changed to accommodate the use of solar power as a source of power. FIGS. 8 and 9 illustrate changes to the flowchart of FIG. 7 for the solar powered circuit.

FIG. 8 is a flowchart illustrating the additional steps used in the solar power version at the beginning of operation. The steps shown in FIG. 8 replace the steps 190 and 191 of FIG. 7A. The steps shown in FIG. 8 are to generate a value for the variable VI which holds a reading value when no input pressure is being measured. Beginning at step 330, the solar cells are generating energy due to the incidence of light upon the cells. A check is made at step 332 to determine if the power is low. If it is low, the microcontroller 32 continues to monitor the level of power until sufficient power is available to power the circuit. The level of power sufficient to operate the circuit depends upon the components used. For the present embodiment, sufficient power is available when the solar cells generate approximately greater than 3 volts DC. Once sufficient power is available to run the circuit, the variable K is set to zero and variable VI is set to FFF at step 334. At step 336, the variable N is set equal to zero. At step 338, the pin PM0 is read to determine the output of the comparator 86. When the output of the comparator is high, at step 340, the variable N is incremented by one at step 342. Once incremented by one, the pin PM0 is read again to determine the length of the pulse appearing at the output of the comparator 86. Once PM0 is not high, a step 343 scans the comparator 86 output continuously until it goes high, as long as N is zero. When N is greater than zero, then the variable K is incremented by one at step 344. The variable K, as previously described is used to determine how many time the pulse appearing at pin PM0 is read so that an accurate reading of the initial value of the pressure at zero can be made. If K is less than two, as determined at step 346, the routine returns to step 336 to make another reading of the output of the comparator 86. If however, K is equal to two, then at step 348 a check is made to determine if N is greater than VI. This check is made to determine if the pressure at zero is increasing so that a stabilized reading can be made of the pressure at zero.

If N is greater than VI, indicating that pressure at zero is changing, then the routine continues to step 352 to determine if K is equal to five. Using K as a counter allows for an accurate reading to be made. If K is less than five, then the routine returns to step 336 to make another reading of N. If it is determined at step 348 that N is not greater than VI, then this result indicates that the value for N may be an accurate representation of the pressure at zero and consequently, the variable VI can be set to N at step 350.

Once it is determined that K is not less than five at step 352, then the program continues to monitor for the appearance of an interrupt at the interrupt pin of the microcontroller 32, indicating that the button 24 has been pushed to begin a pressure reading. Beginning at step 192, the program continues as before for the battery powered version as illustrated in FIGS. 7A, 7B, and 7C except that pin PA1 of the microcontroller 32 is not pulled low or allowed to be at a high impedance since connection of power to the remaining circuitry is no longer necessary since solar power is being used instead of battery power. Consequently, step 206 in FIG. 7A, steps 256, 257, and 281 of FIG. 7B, and step 262 of FIG. 7C are not necessary in the solar power version.

FIG. 9 illustrates the remaining changes to the flow chart of FIG. 7 and in particular FIG. 7C. As shown in FIG. 9, the step 302 remains as before to display the measured value of pressure for 8 seconds. The line 354 corresponds to the line connecting the step 262 as shown in FIG. 7C. As before, if no measurement is made within twenty seconds at step 260, then the buzzer is sounded once at step 264. Once the buzzer is sounded at step 264, the program returns via path 365 to step 192 of FIG. 8 to wait for an interrupt. It is also noted that the step 266 of FIG. 7C is no longer needed in the solar power version and consequently step 266 does not appear in FIG. 9.

If the power is low in the solar powered circuit, the LCD will flash "EEE", "BAT" or some other indication at step 196. Step 196 follows from the decision made at step 194 of FIG. 7A. Once it is determined that the power is low and the user has been informed of this situation at step 196, the routine returns to step 332 as shown in FIG. 8 to wait for sufficient power to calculate a value for the variable VI.

The preferred embodiment described above includes a VCO producing a triangular waveform, a linear pressure transducer and a microcontroller for generating display signals. Such units have been found to product an accurate and inexpensive gauge. Alternative embodiments may also be constructed in which the oscillator is of another type and/or which produces a sawtooth or even a non-linear output signal, e.g., sine wave. Further, a system in accordance with the invention may also be constructed using a non-linear pressure transducer. If an embodiment is constructed with non-linear periodic waveforms and/or non-linear pressure transducers, then the non-linearities should be corrected by means of compensating circuitry or a compensating conversion process within the controller. The use of a look-up table for conversion from time to pressure is an exemplary conversion arrangement which may provide linear or non-linear correction. Additionally, while a programmed microcontroller is disclosed in the preferred embodiment, another type of circuit such as an application-specific circuit, e.g., state machine, may be employed in its place.

Thus there has been described herein an electrical circuit and an electronic tire gauge for measuring and displaying pressure. The electronic tire gauge provides a highly accurate tire gauge for display of pressure in three different units of measure. In addition, the electronic tire gauge includes battery saving features if a battery is used or can be powered by solar energy. It will be understood that various changes in the details, arrangements, and configuration of parts and systems which have been herein described and illustrated in order to explain the nature of the inventions may be made by those skilled in the art within the principle and scope of the invention as expressed in the appended claims.

What is claimed is:

1. A digital tire gauge for measuring the pressure in a tire, said digital tire gauge having electronic circuitry for generating a signal indicative of the measured pressure, a digital display for displaying the signal indicative of the measured pressure and a power source for powering said electronic circuitry and said digital display, said digital tire gauge comprising:
   valve stem fitting means for receiving the valve stem of a tire;
   pressure transducer means coupled to said valve stem fitting means for generating a pressure signal representing pressure sensed by said pressure transducer means;
   oscillator means for generating an oscillating signal comprising a periodic sequence of cycles;
   comparator means responsive to said pressure signal and said oscillating signal for generating comparison signals resulting from the comparison of said oscillating signal to said pressure signal, said comparison signals comprising first portions and second portions, each of said first portions having a time duration equal to the time the pressure signal is greater than the oscillating signal and each of said second portions having a time duration equal to the time the pressure signal is less than the oscillating signal;
   controller means disposed to measure the time durations of said first portions of said comparison signals for generating display signals indicative of pressure sensed by said transducer means for display on the digital display, said controller means generating said display signal after a plurality of cycles of said oscillating signal have been compared to said pressure signal by said comparator means.

2. The digital tire gauge of claim 1 wherein said controller means includes duration comparison means for comparing the time durations of a plurality of first portions to identify which of said plurality of first portions is of maximum duration.

3. The digital tire gauge of claim 2 wherein said controller means includes conversion means for converting said identified first portion having a maximum duration into said display signal for display on the digital display.

4. The digital tire gauge of claim 1 wherein said oscillator means includes means for generating a triangular wave form signal.

5. The digital tire gauge of claim 4 wherein said oscillator means includes means for generating a sawtooth triangular wave form signal.

6. The digital tire gauge of claim 4 wherein said pressure transducer comprises means for generating pressure signals proportional to the pressure sensed by said pressure transducer means.

7. The digital tire gauge of claim 6 wherein said pressure transducer means includes a silicon diaphragm with four diffused resistors configured in a full wheatstone bridge configuration, said wheatstone bridge being coupled to said comparator means.

8. The digital tire gauge of claim 6 wherein said controller means comprises a microcontroller operating in accordance with a stored program and said digital tire gauge comprises decoder means including switch means for controlling the operation of said microcontroller means.

9. The digital tire gauge of claim 1 wherein said oscillator means comprises an adjustable voltage controlled oscillator.

10. The digital tire gauge of claim 1 wherein said power source is a solar cell.

11. The digital tire gauge of claim 1 wherein said power source is a battery.

12. The digital tire gauge of claim 11 wherein said controller means includes power control means for repetitively connecting and disconnecting the battery to and from said transducer means, said oscillator means, and said comparator means until said transducer means senses pressure.

13. The digital tire gauge of claim 1 further comprising a clock for defining bus cycles which are counted by said controller means for measuring the durations of said first portions of said comparison signals.

14. A gauge for measuring a physical stimulus and displaying the measured physical stimulus in human readable form, said gauge comprising:
   a transducer for sensing the physical stimulus and for providing a transducer signal representing the sensed physical stimulus;
   oscillator means for generating an oscillating signal comprising a periodic sequence of cycles;
   comparator means for generating comparison signals, said comparison signals resulting from the comparison of the oscillating signal to the transducer signal, said comparator means coupled to said transducer and said oscillator means, said comparison signals comprising first portions and second portions, each of said first portions having a time duration equal to the time the transducer signal is greater than the oscillating signal and each of said second portions having a time duration equal to the time the transducer signal is less than the oscillating signal;
   microcontroller means disposed to measure the time durations of said portions of said comparison signals for generating display signals indicative of the physical stimulus sensed by said transducer means for display in human readable form, said microcontroller means comprising program memory means for storing a program for controlling said microcontroller to process said comparison signals and generate said display signals.

15. The gauge of claim 14 wherein said microcontroller operating under control of said program comprises duration comparison means for comparing the time durations of a plurality of said first portions to identify which of said plurality of first portions is of maximum duration.

16. The gauge of claim 15 wherein said program memory means includes conversion means for converting said identified first portion having a maximum duration into said display signals.

17. The gauge of claim 14 further comprising a clock for defining bus cycles which are counted by said microcontroller means for measuring the durations of said portions of said comparison signals.

* * * * *